UNITED STATES PATENT OFFICE.

CLARENCE B. SPRAGUE, OF SALT LAKE CITY, UTAH, ASSIGNOR TO UNITED STATES SMELTING, REFINING & MINING COMPANY, A CORPORATION OF MAINE.

METHOD OF TREATING CORROSIVE GASEOUS FUMES OR SMOKE.

984,498.

No Drawing.

Specification of Letters Patent. Patented Feb. 14, 1911.

Application filed April 7, 1908. Serial No. 425,636.

*To all whom it may concern:*

Be it known that I, CLARENCE B. SPRAGUE, a citizen of the United States, residing at 360 Center street, Salt Lake City, in the county of Salt Lake and State of Utah, have invented certain new and useful Improvements in Methods of Treating Corrosive Gaseous Fumes or Smoke; and I do hereby declare the following to be a full, clear, and exact description of the invention, such as will enable others skilled in the art to which it appertains to make and use the same.

The invention relates to the treatment of corrosive gaseous fumes or smoke such as are produced in the roasting or other treatment of sulfid ores for the purpose of removing from the smoke valuable metals and metallic compounds, or compounds and substances which might be injurious to vegetable and animal life if allowed to escape into the atmosphere.

It is well known that the gaseous fumes or smoke produced in the treatment of sulfid ores, especially the sulfid ores of copper and lead having a high per cent. of sulfur, contain large quantities of sulfur dioxid which exists in the smoke in a gaseous state. It is believed that this gas in the dilute condition in which it exists after having been discharged into the atmosphere, does not seriously injure the surrounding vegetation, and it is not the purpose of the present invention to remove this gas from the smoke. The smoke produced in the treatment of many sulfid ores, either because of the composition of the ore or because of the character of the treatment to which the ores are subjected, also contain more or less sulfuric acid and other corrosive compounds which exist in the gaseous products as a vapor or in a finely divided liquid or solid state held in suspension. These minute particles of condensed sulfuric acid and other soluble corrosive compounds collect upon the particles of solid matter known as fume, which are always present in the smoke, and are deposited with the fume upon the surrounding vegetation when the smoke is discharged into the atmosphere, and have an injurious corrosive action upon such vegetation. The solid fume, in addition to valuable metals and metallic compounds, also frequently contains poisonous compounds of arsenic and other substances which not only are injurious to vegetation but also render any vegetation upon which they may collect unfit for food or fodder.

It is the object of the present invention to remove the corrosive constituents and fume from the smoke produced in the roasting and other treatment of such sulfid ores so that the smoke may be discharged into the atmosphere without injury to the surrounding vegetation, and any values contained in the fume may be reclaimed if desired.

In cases where the gaseous fumes or smoke produced in the treatment of ores are free from sulfuric acid and other corrosive compounds, it has been the practice to some extent to remove the fume by filtration through cotton or woolen bags for the purpose of recovering the values contained in the fume. It has heretofore been considered impracticable to successfully filter the smoke produced in the treatment of many of the sulfid ores, and especially the smoke produced in the roasting and smelting of the sulfid ores of lead and copper, because of the inevitable presence in the smoke of sulfuric acid and other corrosive compounds which would quickly destroy the filtering fabric.

In accordance with the present invention, the sulfuric acid and other corrosive acid compounds in the smoke from ore treating furnaces, are completely neutralized by a neutralizing fume intermingled with the smoke so that the fine neutralizing particles are held in suspension and carried along in the smoke with the corrosive acid particles. At the temperature best suited for the filtration of gases through woolen bags or other filtering fabric, there is no deposition of moisture, and therefore the neutralizing fume is unaffected by the non-corrosive sulfur dioxid in the smoke, and need be present only in comparatively small quantities. Such temperature is however below the condensing point of sulfuric acid, and the sulfuric acid contained within the smoke will therefore be condensed, and will exist in the minute particles held in suspension in the smoke. These fine particles come into intimate relation with the fine particles of the neutralizing fume which are floating about in the smoke and unite with the neutralizing particles to form non-corrosive compounds. The acidity of any acid salts held in suspension in the smoke will also be neutralized by the neutralizing fume, and any soluble salts of heavy metal, such as iron or copper, which may have become moist or adhesive, and would have a destructive or corrosive action upon the filtering fabric, will be decomposed by the neutralizing fume, and non-corrosive compounds formed. The corrosive acid compounds in the smoke will therefore be completely neutralized, so that the smoke may be successfully filtered through fabric without injury to the fabric, or be discharged into the atmosphere.

I have found that a complete neutralization of the corrosive acid compounds in the smoke may be best secured by intermingling zinc oxid fume with the smoke. The zinc oxid fume may be produced by roasting zinc ore in a special furnace arranged to discharge the zinc oxid fume produced therein into the flue through which the acid smoke is passing. The fine particles of zinc oxid fume, and non-corrosive compounds formed, into contact with all the minute particles of corrosive acid compound and unite with these to form non-corrosive compounds.

I have also discovered that in roasting or otherwise treating sulfid ores the composition of which is such that with the methods heretofore practiced the smoke produced would contain sulfuric acid and other corrosive compounds in such quantities as to render their filtration through fabric impracticable, the fumes and gases may be neutralized and their filtration through fabric rendered practicable by adding to the charge to be treated a substance of such a character that it will during treatment of the charge produce a neutralizing agent which mingles with the gases and fumes from the main body of ore under treatment. Any suitable substance which when added to the charge within the ore treating furnace will produce a neutralizing agent having the property of neutralizing acids and the acidity of acid salts, or of decomposing the soluble salts of heavy metals such as iron and copper when in solution, may be employed. I prefer, however, to employ an ore or substance which during the treatment of the charge will produce a zinc oxid, since I have found that this oxid is especially effective in neutralizing the sulfuric acid and other corrosive compounds produced in the treatment of the main body of ore.

In roasting or otherwise treating ores which are of such a composition that the smoke produced would under the usual practice contain comparatively large quantities of sulfuric acid and other corrosive compounds, the neutralization of the smoke may be effectively accomplished by mixing with the ore to be treated the requisite quantity of a zinc ore, which, during the treatment of the ore will produce zinc oxid fume intermingled with the gases and fumes from the main body of the ore under treatment. I have found that in such case the particles or fume of zinc oxid which are produced in the treatment of the ore either combine with the corrosive compounds simultaneously with their production, or remain in suspension in the smoke as it passes through the flues and are brought into intimate relation with the particles of corrosive compounds escaping with the gaseous products and effectively neutralize such compounds, so that the smoke when cooled sufficiently to be passed through filtering fabric is non-corrosive. Comparatively large quantities of sulfuric acid and corrosive compounds which would otherwise be present in the smoke may be thus neutralized by combining with the ore to be treated an ore containing an amount of zinc which is a small percentage of the ore under treatment. The smoke as it comes to the filtering fabric will contain no corrosive compounds, and may be filtered through the fabric without injury thereto. By this treatment, therefore, metals, metallic compounds, and poisonous and injurious compounds contained within the fume, and the corrosive and injurious compounds held in suspension, are removed from the smoke before it is discharged into the atmosphere. The danger of injury to vegetation is thus eliminated or reduced to a minimum, and the solid fume is collected so that any values contained therein may be reclaimed if desired by the proper subsequent treatment.

The form of apparatus utilized in practicing the invention is immaterial and may be of any well known or usual construction.

Having thus described the invention, what is claimed is:—

1. The method of removing injurious or valuable compounds from smoke produced in the treatment of sulfid ores, consisting in neutralizing the smoke by adding to the charge to be treated a substance which during the treatment of the charge will produce a neutralizing fume for neutralizing the corrosive compounds produced from the main body of ore, and then filtering the smoke to remove the fume, substantially as described.

2. The method of removing injurious or valuable compounds from the smoke produced from the treatment of sulfid ores consisting in neutralizing the smoke by adding to the charge to be treated a substance which during the treatment of the ore will produce zinc oxid fume for neutralizing the corrosive compounds produced from the main body of ore, and then filtering the smoke to remove the fume, substantially as described.

3. The method of neutralizing the corrosive constituents of corrosive gaseous fumes or smoke consisting in intermingling therewith a neutralizing fume which is held in suspension in the smoke and unites with the corrosive compounds to form non-corrosive compounds, substantially as described.

984,498

4. The method of neutralizing the corrosive constituents of corrosive gaseous fumes or smoke consisting in intermingling therewith zinc oxid fume which is held in suspension therein in the smoke and unites with the corrosive compounds to form non-corrosive compounds, substantially as described.

5. The method of treating corrosive gaseous fumes or smoke for the purpose of removing injurious or valuable compounds therefrom consisting in mingling neutralizing fume with the smoke to neutralize the corrosive compounds therein, and thereafter passing the smoke through a filtering fabric to remove the fume, substantially as described.

6. The method of treating corrosive gaseous fumes or smoke for the purpose of removing injurious or valuable compounds therefrom consisting in mingling zinc oxid fume with the smoke to neutralize the corrosive compounds therein, and thereafter passing the smoke through a filtering fabric to remove the fume, substantially as described.

In testimony whereof I affix my signature, in presence of two witnesses.

CLARENCE B. SPRAGUE.

Witnesses:
WILLIAM M. BRADLEY,
WILLIAM PISCHEL.

---

Correction in Letters Patent No. 984,498.

It is hereby certified that in Letters Patent No. 984,498, granted February 14, 1911, upon the application of Clarence B. Sprague, of Salt Lake City, Utah, for an improvement in "Methods of Treating Corrosive Gaseous Fumes or Smoke," an error appears in the printed specification requiring correction as follows: Page 2, line 20, the words "fume, and non-corrosive compounds formed," should be stricken out and the words *fume as they float along in the smoke come* inserted instead; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*

4. The method of neutralizing the corrosive constituents of corrosive gaseous fumes or smoke consisting in intermingling therewith zinc oxid fume which is held in suspension therein in the smoke and unites with the corrosive compounds to form non-corrosive compounds, substantially as described.

5. The method of treating corrosive gaseous fumes or smoke for the purpose of removing injurious or valuable compounds therefrom consisting in mingling neutralizing fume with the smoke to neutralize the corrosive compounds therein, and thereafter passing the smoke through a filtering fabric to remove the fume, substantially as described.

6. The method of treating corrosive gaseous fumes or smoke for the purpose of removing injurious or valuable compounds therefrom consisting in mingling zinc oxid fume with the smoke to neutralize the corrosive compounds therein, and thereafter passing the smoke through a filtering fabric to remove the fume, substantially as described.

In testimony whereof I affix my signature, in presence of two witnesses.

CLARENCE B. SPRAGUE.

Witnesses:
WILLIAM M. BRADLEY,
WILLIAM PISCHEL.

---

Correction in Letters Patent No. 984,498.

It is hereby certified that in Letters Patent No. 984,498, granted February 14, 1911, upon the application of Clarence B. Sprague, of Salt Lake City, Utah, for an improvement in "Methods of Treating Corrosive Gaseous Fumes or Smoke," an error appears in the printed specification requiring correction as follows: Page 2, line 20, the words "fume, and non-corrosive compounds formed," should be stricken out and the words *fume as they float along in the smoke come* inserted instead; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*

It is hereby certified that in Letters Patent No. 984,498, granted February 14, 1911, upon the application of Clarence B. Sprague, of Salt Lake City, Utah, for an improvement in "Methods of Treating Corrosive Gaseous Fumes or Smoke," an error appears in the printed specification requiring correction as follows: Page 2, line 20, the words "fume, and non-corrosive compounds formed," should be stricken out and the words *fume as they float along in the smoke come* inserted instead; and that the said Letters Patent should be read with this correction therein that the same may conform to the record of the case in the Patent Office.

Signed and sealed this 21st day of March, A. D., 1911.

[SEAL.]

E. B. MOORE,
*Commissioner of Patents.*